United States Patent
Fan et al.

(10) Patent No.: US 12,260,171 B1
(45) Date of Patent: Mar. 25, 2025

(54) EDITING DATA SETS VIA NON-EDITABLE WORKBOOKS

(71) Applicant: SIGMA COMPUTING, INC., San Francisco, CA (US)

(72) Inventors: Siyuan Fan, San Francisco, CA (US); Jack R. Bens, San Francisco, CA (US); Stipo Josipovic, San Francisco, CA (US); Janice Lyu, Queens, NY (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

(21) Appl. No.: 17/993,380

(22) Filed: Nov. 23, 2022

Related U.S. Application Data

(60) Provisional application No. 63/407,996, filed on Sep. 19, 2022.

(51) Int. Cl.
*G06F 40/18* (2020.01)
*G06F 16/25* (2019.01)

(52) U.S. Cl.
CPC ............ *G06F 40/18* (2020.01); *G06F 16/254* (2019.01)

(58) Field of Classification Search
CPC ................................ G06F 40/18; G06F 16/254
USPC .......................................................... 715/212
See application file for complete search history.

(56) References Cited

U.S. PATENT DOCUMENTS

| | | | | | |
|---|---|---|---|---|---|
| 2010/0269033 | A1* | 10/2010 | Siegel | .................. | G06F 40/103 358/1.18 |
| 2015/0089475 | A1* | 3/2015 | Geng | ..................... | G06F 16/93 717/121 |

FOREIGN PATENT DOCUMENTS

CN          112508540  A  *  3/2021  ............ G06F 16/211

* cited by examiner

*Primary Examiner* — Haoshian Shih

(57) ABSTRACT

Editing data sets via non-editable workbooks including presenting, by a workbook manager on a client computing system, a workbook in an exploration mode that displays edits to the workbook without altering the workbook, wherein the workbook presents a data set from a cloud-based data warehouse; receiving, by the workbook manager via the workbook, a change to the workbook and an edit to the data set from a client account associated with the client computing system; determining, by the workbook manager, that the client account is authorized to edit the data set on the cloud-based data warehouse and that the client account lacks authorization to commit changes to the workbook; and applying, by the workbook manager, the edit to the data set in the cloud-based data warehouse.

20 Claims, 6 Drawing Sheets

EDITING DATA SETS VIA NON-EDITABLE WORKBOOKS

BACKGROUND

Field of the Invention

The field of the invention is data processing, or, more specifically, methods, apparatus, and products for editing data sets via non-editable workbooks.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for editing data sets via non-editable workbooks including presenting, by a workbook manager on a client computing system, a workbook in an exploration mode that displays edits to the workbook without altering the workbook, wherein the workbook presents a data set from a cloud-based data warehouse; receiving, by the workbook manager via the workbook, a change to the workbook and an edit to the data set from a client account associated with the client computing system; determining, by the workbook manager, that the client account is authorized to edit the data set on the cloud-based data warehouse and that the client account lacks authorization to commit changes to the workbook; and applying, by the workbook manager, the edit to the data set in the cloud-based data warehouse.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
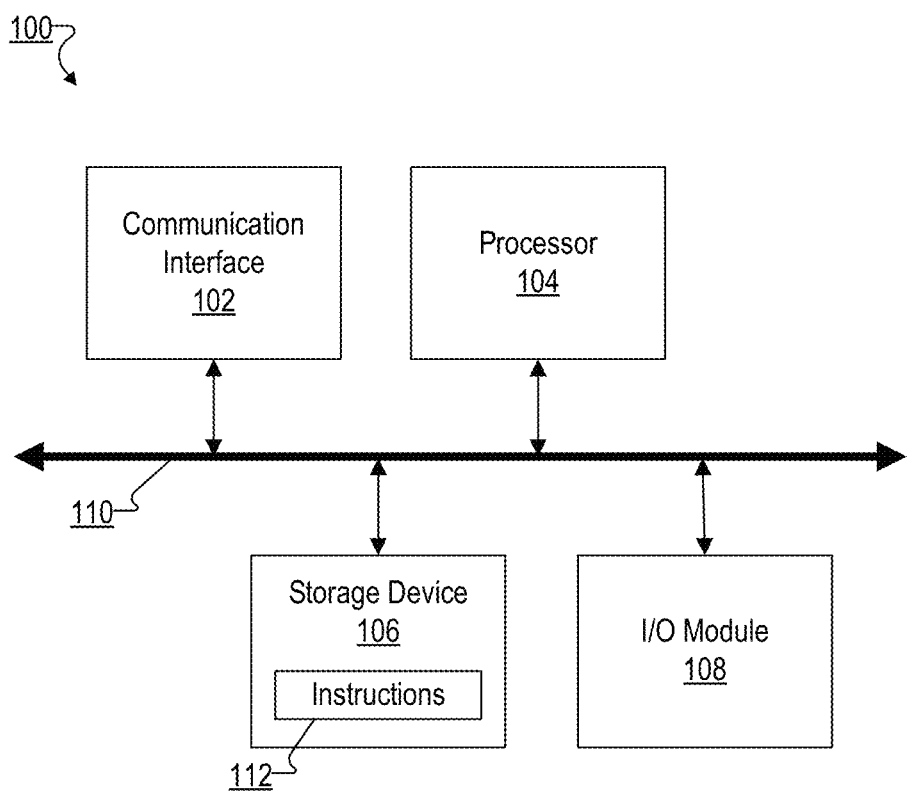
FIG. 1 sets forth a block diagram of an example system configured for editing data sets via non-editable workbooks according to embodiments of the present invention.

Example methods, apparatus, and products for editing data sets via non-editable workbooks in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
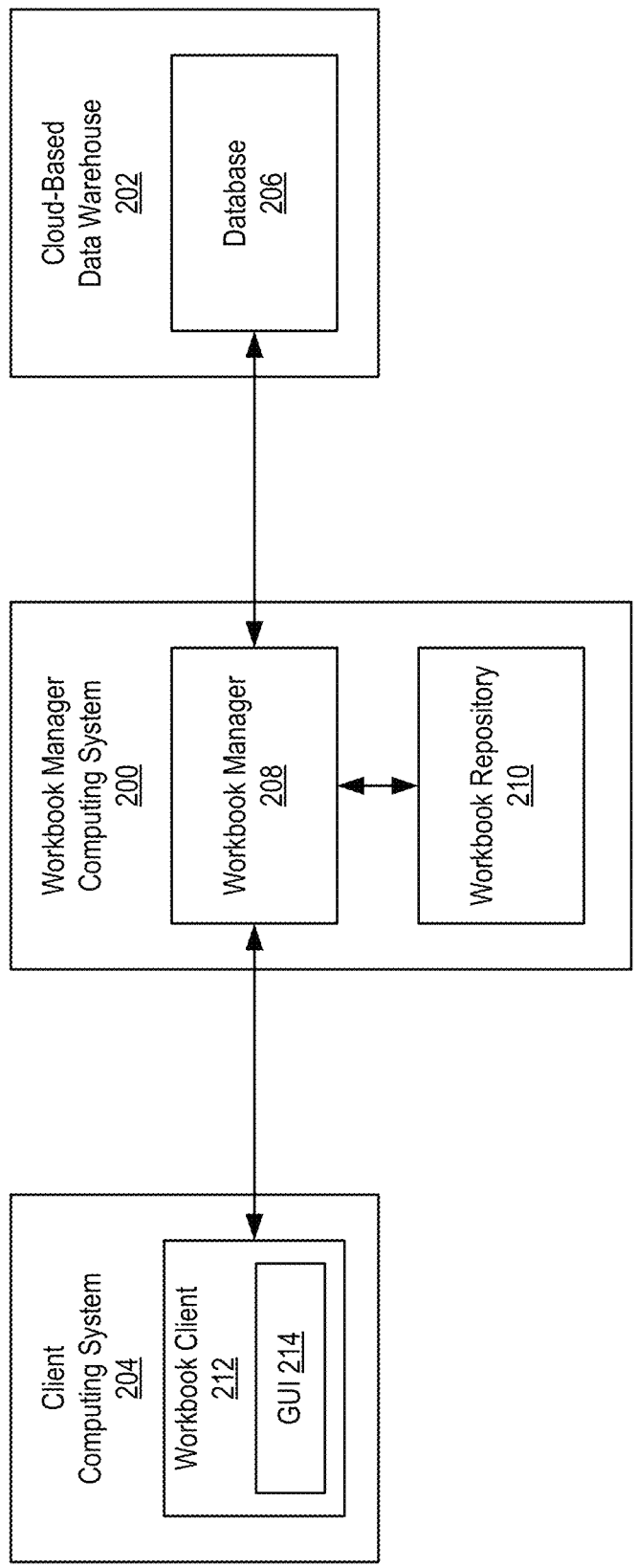
FIG. 2 sets forth a block diagram of an example system configured for editing data sets via non-editable workbooks according to embodiments of the present invention.

For further explanation, FIG. 2 illustrates an exemplary block diagram depicting an exemplary system for editing data sets via non-editable workbooks according to embodiments of the present invention. As shown in FIG. 2, the system includes a workbook manager computing system 200, a cloud-based data warehouse 202, and a client computing system 204. The workbook manager computing system 200 includes a workbook manager 208 and a workbook repository 210. The client computing system 204 includes a workbook client 212 with a graphical user interface (GUI) 214. The cloud-based data warehouse 202 includes a database 206.

The workbook manager 208 is hardware, software, or an aggregation of hardware and software configured to present a data set within a workbook on a client computing system 204 via the workbook client 212. The workbook manager 208 retrieves the data set from the database 206 by issuing a database statement to the cloud-based data warehouse 202 requesting the data set. In response, the cloud-based data warehouse 202 sends query results including the data set to the workbook manager 208. Once the query results are received, the data set is then organized according to the workbook metadata to generate the workbook. The workbook is then sent to a workbook client 212 on the client computing system 204 for presentation to a client. The workbook manager 208 may reside on a workbook manager computing system 200, which may be an intermediary computing system between the client computing system 204 and the cloud-based data warehouse 202.

A workbook is a presentation of a data set from a cloud-based data warehouse 202. A workbook may include a collection of graphical elements and organizing mechanism for the data set. Each workbook is a combination of a data set from the cloud-based data warehouse 202 and workbook metadata that describes the organization of the data set for presentation to a user. The workbook metadata may also include a description of the data set sufficient to generate a database statement targeting the cloud-based data warehouse to retrieve the data set. A workbook may include multiple elements, such as a visualization or spreadsheet structure. For example, a workbook may include a spreadsheet structure presenting data points from a data set and an accompanying visualization may present a graph of the data points. Such workbooks may be stored in the workbook repository 210. Workbooks are described in further detail below.

The workbook client 212 is a part of the workbook manager 208 and works in concert with the workbook manager 208 to present a workbook on a client computing system 204. The workbook client 212 may perform local processing of changes made to the workbook and/or the data set. The workbook client 212 may be an application executing within a web browser. The workbook client 212 may be part of an Internet application that includes the workbook manager 208 and is hosted on the workbook manager computing system 200.

The GUI 214 is a visual presentation configured to present data sets and workbooks to a client. The GUI 214 may receive requests from a client for data sets from the database 206. The GUI 214 may also present to the client the ability to add a new row into a data set or table and enter values for each column of the new row. The GUI 214 may be displayed on client computing system 204 (e.g., on a system display or mobile touchscreen).

The database 206 is a collection of data and a management system for the data. A data set is a collection of data (such as a table) from the database 206. Data sets may be organized into columns and rows (also referred to as records). The particular columns, rows, and organization of the columns and rows that make up a data set may be specified in the database statement requesting the data set. Data sets may be sent from the cloud-based data warehouse 202 in response to a database statement (also referred to as a query). Accordingly, data sets retrieved in response to a database statement may be referred to as query results. The database statement may be a structured query language statement.

The workbook manager 208 and workbook client 212 may exchange information using state specifications. A state specification is a collection of data describing inputs into the GUI 214. The state specification may include manipulations of GUI elements within the GUI 214 along with data entered into the GUI 214 by a user of the client computing system 204. Such manipulations and data may indicate requests for and manipulations of data sets. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data set. Such elements may include filters applied to an element of the workbook, the hierarchical level of an element of the workbook, joins performed within an element of the workbook, exposable parameters in an element of the workbook, and security for the workbook.

The workbook manager 208 may use the state specification as input to compile a database statement. This database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

Figure 3:
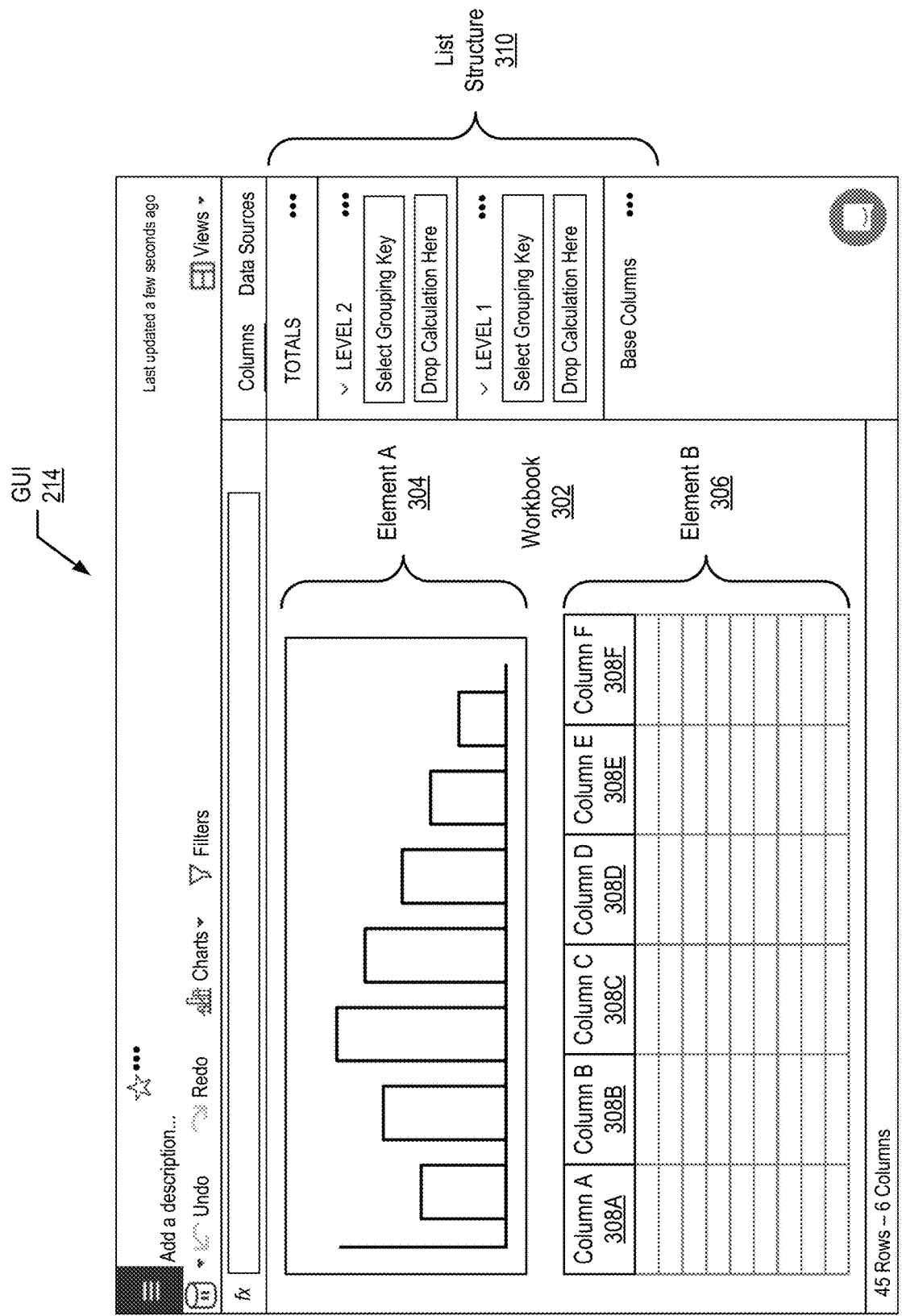
FIG. 3 sets forth a block diagram of an example system configured for editing data sets via non-editable workbooks according to embodiments of the present invention.

FIG. 3 shows an exemplary GUI for editing data sets via non-editable workbooks according to embodiments of the present invention. As shown in FIG. 3, the exemplary GUI 214 includes a workbook 302 and a list structure 310. The workbook 302 includes two elements (element A 304, element B 306). Element A 304 is a visualization 304 and element B 306 is a spreadsheet structure 306 (shown as empty rows) with six columns (column A 308a, column B 308b, column C 308c, column D 308d, column E 308e, column F 308f).

The workbook 302 is a collection of graphical elements and organizing mechanism for a data set. The workbook may present a data set retrieved by the workbook manager from a cloud-based data warehouse. The data set may then be organized based on the workbook metadata retrieved from the workbook repository. As shown in FIG. 3, the workbook 302 includes two workbook elements. Element A 304 is a visualization of a data set and element B 306 is a spreadsheet structure. The visualization is a graphical element that conveys relationships between data in the data set. The visualization may include, for example, graphs, charts, or maps. The spreadsheet structure is a presentation of a data set (such as a table) from a database on a data warehouse. The spreadsheet structure displays rows of data organized by columns (column A 308a, column B 308b, column C 308c, column D 308*d*, column E 308*e*, column F 308*f*). The columns delineate different categories of the data in each row. One or more columns may be calculation columns that include calculation results using other columns in the spreadsheet structure based on a formula received from the client. Both the visualization and the spreadsheet structure may include dynamic elements and be configured to interact with a client using the client computing system 204 via the GUI 214. Each workbook element 304, 306 may use a data set unique to that workbook element or use a data set shared by at least one workbook element.

The list structure 310 is a graphical element used to define and organize the workbook elements, such as hierarchical relationships between the columns (column A 308*a*, column B 308*b*, column C 308*c*, column D 308*d*, column E 308*e*, column F 308*f*) of the of the spreadsheet structure. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure 310 may present a dimensional hierarchy to the user. Specifically, the list structure 310 may present levels arranged hierarchically across at least one dimension. Each level within the list structure 310 is a position within a hierarchical relationship between columns (column A 308*a*, column B 308*b*, column C 308*c*, column D 308*d*, column E 308*e*, column F 308*f*) of the spreadsheet structure element 306. The keys within the list structure 310 identify the one or more columns that are the participants in the hierarchical relationship. Each level may have more than one key.

One of the levels in the list structure 310 may be a base level. Columns selected for the base level provide data at the finest granularity. One of the levels in the list structure 310 may be a totals or root level. Columns selected for the totals level provide data at the highest granular level. For example, the totals level may include a field that calculates the sum of each row within a single column of the entire data set (i.e., not partitioned by any other column).

The GUI 214 may enable a user to drag and drop columns (column A 308*a*, column B 308*b*, column C 308*c*, column D 308*d*, column E 308*e*, column F 308*f*) into the list structure 310. The order of the list structure 310 may specify the hierarchy of the columns relative to one another. A user may be able to drag and drop the columns in the list structure 310 at any time to redefine the hierarchical relationship between columns. The hierarchical relationship defined using the columns selected as keys in the list structure 310 may be utilized in charts such that drilling down (e.g., double click on a bar), enables a new chart to be generated based on a level lower in the hierarchy.

The GUI 214 may also include a mechanism for a user to request a data set from a database to be presented as a workbook element in a workbook 302. Such a mechanism may be part of the interactivity of the workbook 302. Specifically, a user may manipulate a workbook (e.g., by dragging and dropping columns or rows, resorting columns or rows, manipulating a graph etc.) and, in response, the GUI 214 may generate a request (e.g., in the form of a state specification) for a data set and send the request to the workbook manager 126. Such a mechanism may also include a direct identification of the rows and columns of a database table that a user would like to access (e.g., via a selection of the rows and columns in a dialog box). The GUI 214 may also include a mechanism for a user to create a new table on the database, add rows to a table, and move rows within the table.

Figure 4:
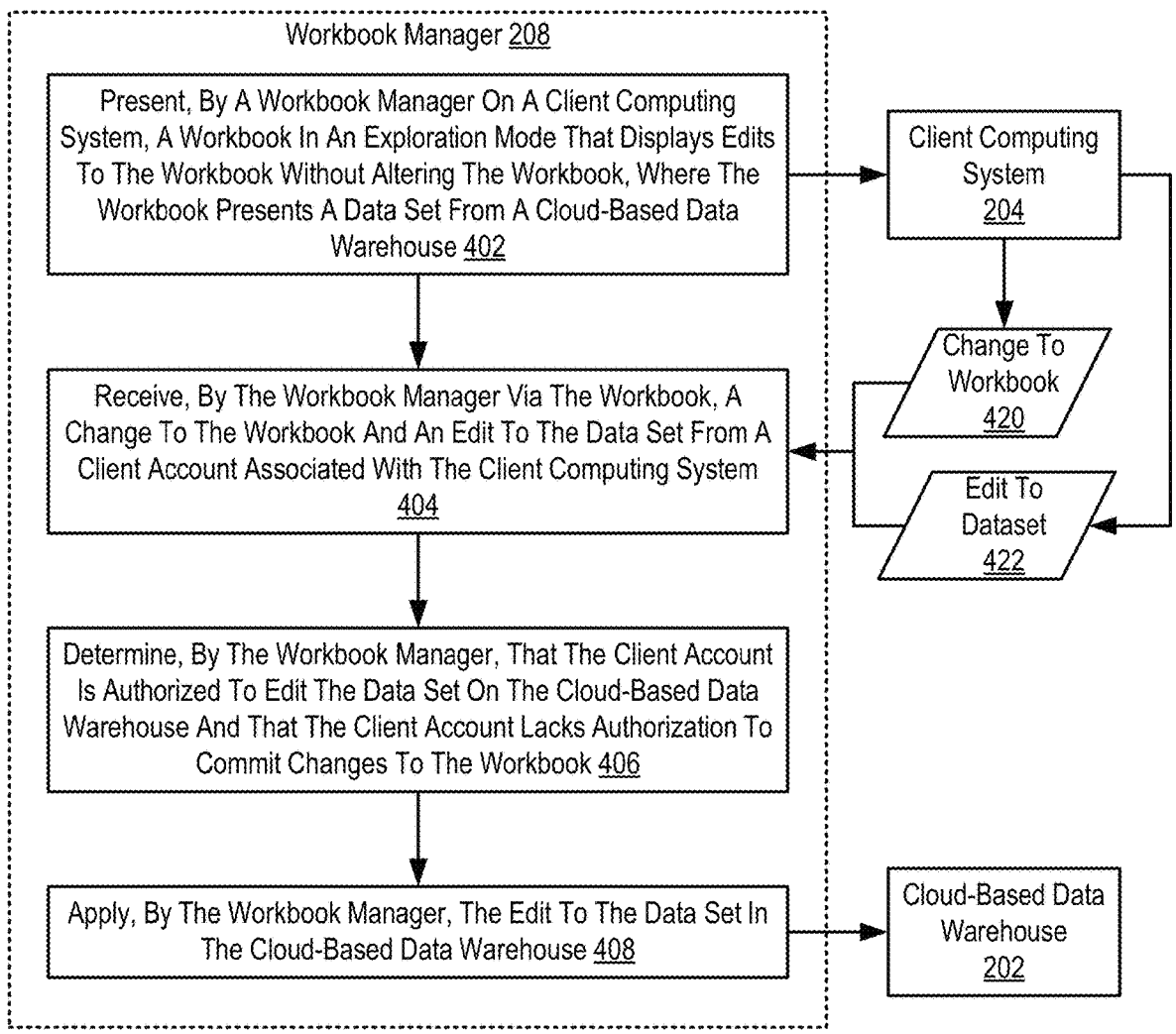
FIG. 4 sets forth a flow chart illustrating an exemplary method for editing data sets via non-editable workbooks according to embodiments of the present invention.

For further explanation, FIG. 4 sets forth a flow chart illustrating an exemplary method for editing data sets via non-editable workbooks according to embodiments of the present invention. The method of FIG. 4 includes presenting 402, by a workbook manager 208 on a client computing system 204, a workbook in an exploration mode that displays edits to the workbook without altering the workbook, wherein the workbook presents a data set from a cloud-based data warehouse 202. Presenting 402 the workbook in an exploration mode may be carried out by generating the workbook using workbook metadata and the data set retrieved from the cloud-based data warehouse 202. The workbook may be created by a different client (i.e., the workbook owner) using a different client computing system. The workbook may include multiple workbook elements, such as a visualization and/or spreadsheet structure.

The exploration mode (also referred to as an exploration of a workbook) is a mode of interacting with a workbook in which changes made to the workbook are displayed but not saved or committed to the underlaying workbook. Rather, the changes made to the workbook in the exploration mode may be discarded after the workbook is closed or stored separately (e.g., as a new workbook or a bookmark). Another client accessing the underlying workbook would not be presented with the changes made to the exploration of the workbook.

Interacting with an exploration of a workbook may be initiated for a variety of reasons. The client may desire to temporarily reconfigure the workbook to study a relationship between data points in the data set not presented in the underlying workbook. Alternatively, the client may not have access or permissions to edit the workbook itself. The client may then configure the exploration of the workbook as necessary.

For example, a sales manager may create a workbook for a customer relationship management data set. Specifically, the workbook may organize a data set containing customer and sales data. The sales manager may oversee a team of salespeople that update the data set using the workbook with data about events related to each customer. The sales manager may want the salespeople to be able to use the workbook to add or edit data in the data set but be unable to make persistent changes to the workbook itself.

The method of FIG. 4 also includes receiving 404, by the workbook manager 208 via the workbook, a change to the workbook 420 and an edit to the data set 422 from a client account associated with the client computing system 204. Receiving 404 the change to the workbook 420 and the edit to the data set 422 from a client account may be carried out by the workbook client detecting the change to the workbook and the edit to the data set and sending the change to the workbook and the edit to the data set to the workbook manager 208. The change to the workbook and the edit to the data set may be received by the workbook manager as a state specification.

The workbook change may include modifications to the workbook visualization. The visualization may be modified to alter the relationships between data points presented in the visualization. For example, the workbook change may change the data sources for bars in a bar graph. The workbook change may also include modifications to the workbook spreadsheet structure. The spreadsheet structure may be modified to change the presentation of columns or rows, or may be modified to include an additional column, such as a calculation column. For example, the workbook change may add a column summing the values of two other columns in the spreadsheet structure.

The data set edit may include new data to be added to the data set on the cloud-based data warehouse. For example, the data set edit may be data placed in a particular column of a particular row on a table presenting the data set. Alternatively, the data set edit may be a deletion of existing data or the modification of existing data.

Continuing with the example from above, a salesperson may want to use a particular configuration of the workbook in order to edit the data set more efficiently (e.g., filtering the data set within a spreadsheet structure element). The salesperson may then change the workbook and submit an edit to the dataset. The edit may be submitted by clicking on a cell in the spreadsheet structure and inputting text into the cell.

The method of FIG. 4 also includes determining 406, by the workbook manager 208, that the client account is authorized to edit the data set on the cloud-based data warehouse 202 and that the client account lacks authorization to commit changes to the workbook. Determining 406 that the client account is authorized to edit the data set and that the client account lacks authorization to commit changes to the workbook may be carried out by accessing the client permissions, data set permissions, and/or the workbook permissions. The workbook permissions may be available on the workbook manager computing system and may have been set by the workbook owner (i.e., a client that controls the permissions of the workbook). Determining 406 that the client account lacks authorization to commit changes to the workbook may be carried out by inspecting the workbook permissions and/or the client permissions to determine that the client account has not been granted access to save changes to the workbook.

In order to edit the data set on the cloud-based data warehouse, the client account may require authorization by the owner of the data on the cloud-based data warehouse 202. The client account may have such authorization from the owner of the data. Alternatively, the workbook manager 208 may create an association between the client account and a separate account authorized to modify the data set on the cloud-based data warehouse. Based on the association, edits made by the client account may be applied to the data set using the credentials of the separate authorized account. Determining 406 that the client account is authorized to edit the data set may be carried out by inspecting the client permissions, any associated account permissions, and/or the permissions associated with the data set to determine that the client account is authorized to edit the data set.

The method of FIG. 4 also includes applying 408, by the workbook manager 208, the edit to the data set 422 in the cloud-based data warehouse 202. Applying 408 the edit to the data set 422 in the cloud-based data warehouse 202 may be carried out by compiling the edit to the data set (e.g., as contained in a state specification) into a database statement targeting the database on the cloud-based data warehouse 202. Once compiled, the workbook manager 208 sends the database statement to the cloud-based data warehouse 202 and may receive, in response, an acknowledgement that the edit has been applied to the data set.

Figure 5:
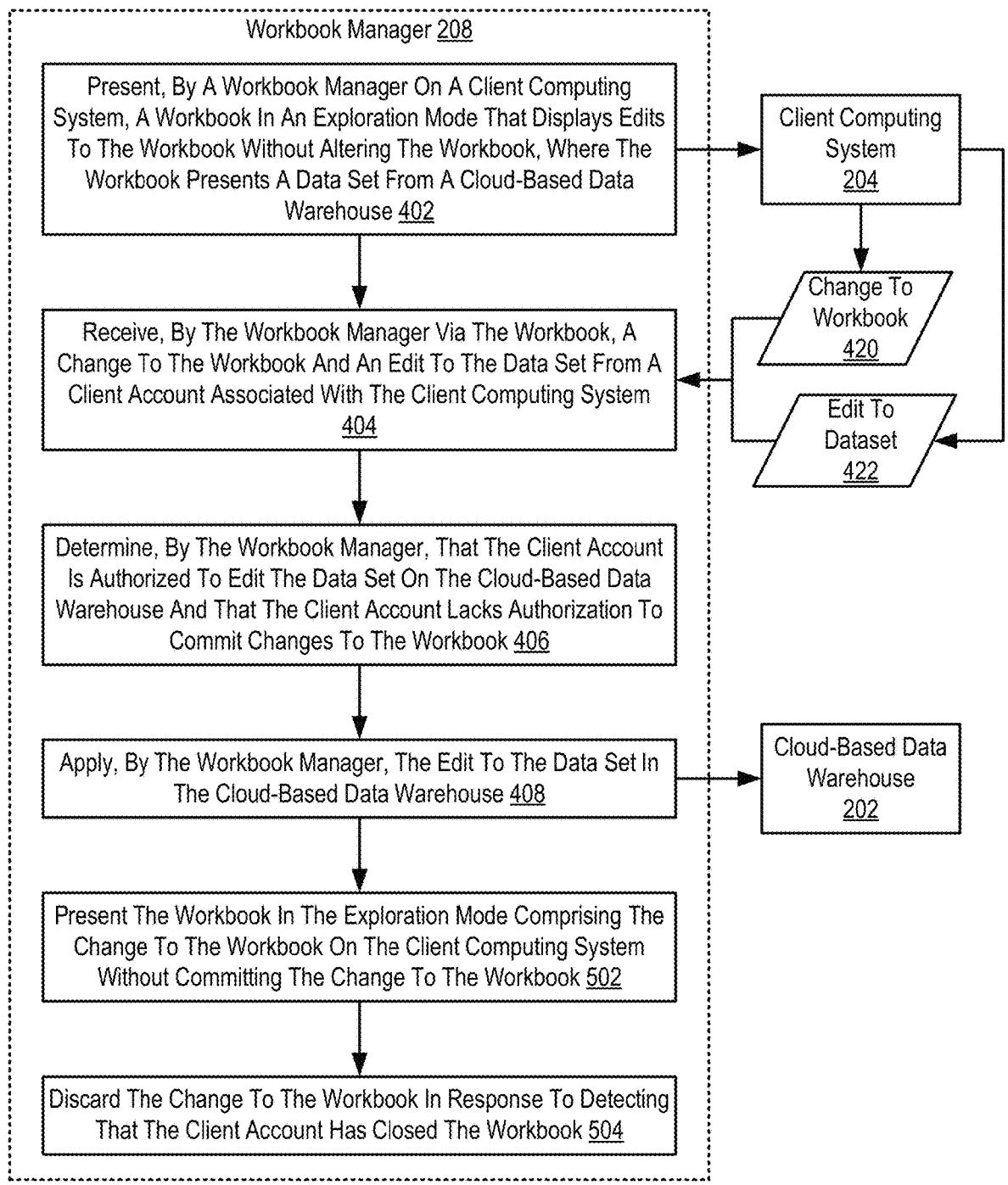
FIG. 5 sets forth a flow chart illustrating an exemplary method for editing data sets via non-editable workbooks according to embodiments of the present invention.

For further explanation, FIG. 5 sets forth a flow chart illustrating a further exemplary method for editing data sets via non-editable workbooks according to embodiments of the present invention that includes presenting 402, by a workbook manager 208 on a client computing system 204, a workbook in an exploration mode that displays edits to the workbook without altering the workbook, wherein the workbook presents a data set from a cloud-based data warehouse 202; receiving 404, by the workbook manager 208 via the workbook, a change to the workbook 420 and an edit to the data set 422 from a client account associated with the client computing system 204; determining 406, by the workbook manager 208, that the client account is authorized to edit the data set on the cloud-based data warehouse 202 and that the client account lacks authorization to commit changes to the workbook; and applying 408, by the workbook manager 208, the edit to the data set 422 in the cloud-based data warehouse 202.

The method of FIG. 5 differs from the method of FIG. 4, however, in that the method of FIG. 5 further includes presenting 502 the workbook in the exploration mode comprising the change to the workbook on the client computing system 204 without committing the change to the workbook; and discarding 504 the change to the workbook in response to detecting that the client account has closed the workbook.

Presenting 502 the workbook in the exploration mode with the change to the workbook without committing the change to the workbook may be carried out by creating a temporary workbook file (e.g., in volatile memory or the workbook repository). The temporary workbook file may utilize the underlying workbook as a data source such that any changes to the underlying workbook (or data set from the cloud-based data warehouse) would be propagated to the temporary workbook file when opened by the client (e.g., via a bookmark). Once the temporary workbook file is created, the workbook manager 208 may then change the temporary workbook file according to the change to the workbook 420. Presenting 502 the workbook in the exploration mode with the change to the workbook may also be carried out by displaying the temporary changed workbook on the client computing system 204 via the workbook client.

Detecting that the client account has closed the workbook may be carried out by receiving, via the workbook client, a notification that the client has indicated that the workbook should be removed from presentation. The notification may include the activation of a "close" button for the workbook. Discarding 504 the change to the workbook in response to detecting that the client account has closed the workbook may be carried out by removing the temporary workbook file from the workbook manager computing system (e.g., from the volatile memory or the workbook repository). Alternatively, the client may indicate that the temporary workbook with the workbook changes should be saved. Saving the workbook comprising the change to the workbook to a new workbook associated with the client account may be carried out by converting the temporary workbook into a new workbook accessible at a later time by the client account and stored for later retrieval (e.g., in the workbook repository).

Figure 6:
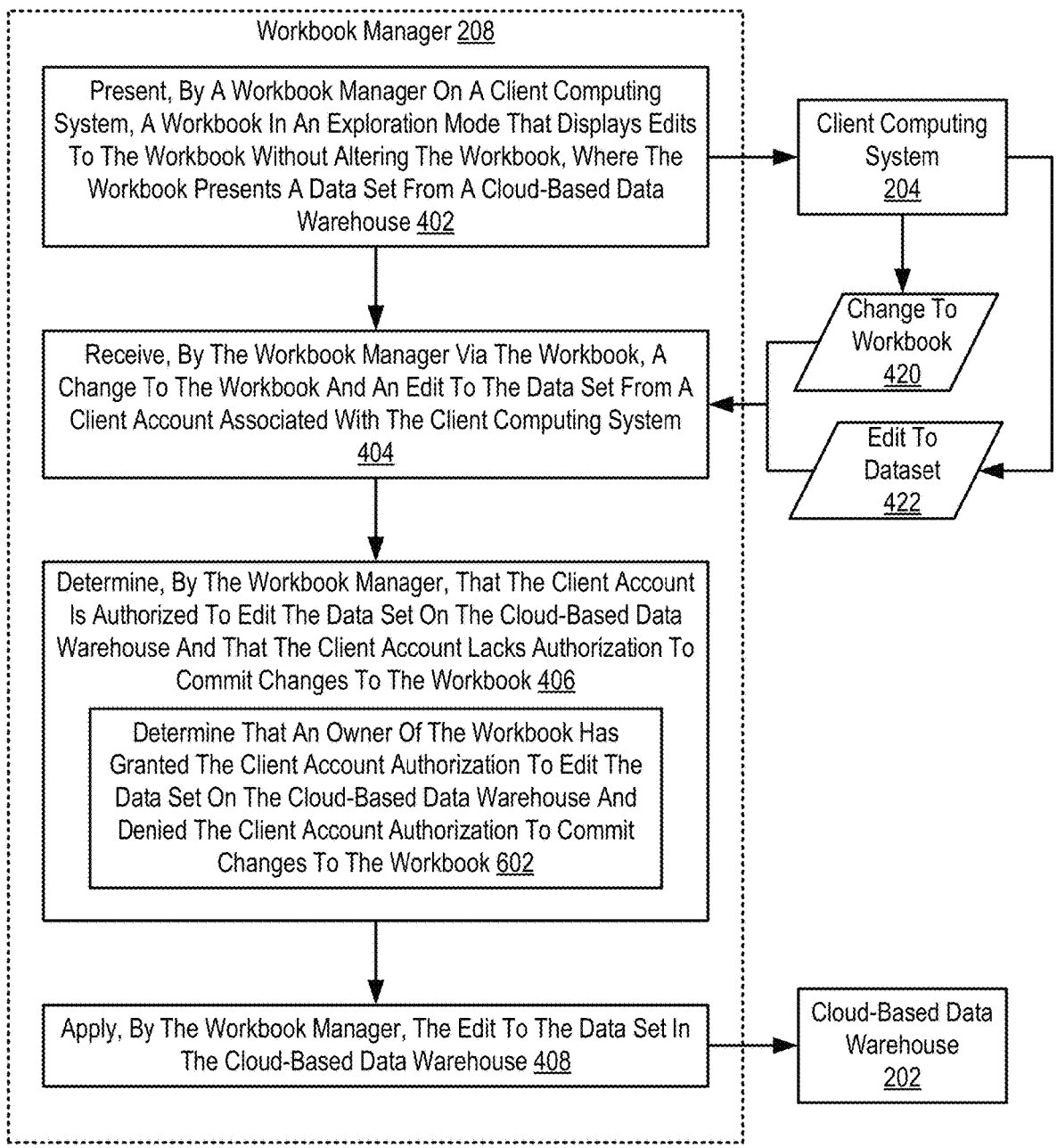
FIG. 6 sets forth a flow chart illustrating an exemplary method for editing data sets via non-editable workbooks according to embodiments of the present invention.

For further explanation, FIG. 6 sets forth a flow chart illustrating a further exemplary method for editing data sets via non-editable workbooks according to embodiments of the present invention that includes presenting 402, by a workbook manager 208 on a client computing system 204, a workbook in an exploration mode that displays edits to the workbook without altering the workbook, wherein the workbook presents a data set from a cloud-based data warehouse 202; receiving 404, by the workbook manager 208 via the workbook, a change to the workbook 420 and an edit to the data set 422 from a client account associated with the client computing system 204; determining 406, by the workbook manager 208, that the client account is authorized to edit the data set on the cloud-based data warehouse 202 and that the client account lacks authorization to commit changes to the workbook; and applying 408, by the workbook manager 208, the edit to the data set 422 in the cloud-based data warehouse 202.

The method of FIG. 6 differs from the method of FIG. 4, however, in that determining 406, by the workbook manager 208, that the client account is authorized to edit the data set on the cloud-based data warehouse 202 and that the client account lacks authorization to commit changes to the workbook includes determining 602 that an owner of the workbook has granted the client account authorization to edit the data set on the cloud-based data warehouse 202 and denied the client account authorization to commit changes to the workbook.

Determining 602 that an owner of the workbook has denied the client account authorization to commit changes to the workbook may be carried out by detecting that the owner of the workbook has altered (or left as default) the permissions of the workbook to disallow changes to the workbook to be saved to the workbook by other client accounts. Determining 602 that an owner of the workbook has granted the client account authorization to edit the data set on the cloud-based data warehouse 202 may be carried out by detecting that the owner of the workbook has the authorization to grant the client the ability to edit the data set. Granting the client the ability to edit the data set may be by adding the client to a list of authorized users on the database with the ability to edit the data set. Alternatively, the owner of the workbook may associate the client with an account currently authorized to edit the data set such that edits submitted by the client are applied to the data set using the credentials of the authorized account. Once the workbook manager 208 has detected that the owner of the workbook has the authorization to grant the client the ability to edit the data set, the workbook manager 208 may then determine if such authorization has actually been granted to the client.

In view of the explanations set forth above, readers will recognize that the benefits of editing data sets via non-editable workbooks according to embodiments of the present invention include:

Improving the operation of the computer system by enabling clients without authorization to commit changes to a workbook to edit a data set using the workbook as a medium for data set editing, increasing system utility.

Exemplary embodiments of the present invention are described largely in the context of a fully functional computer system for editing data sets via non-editable workbooks. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIG.s illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for editing data sets via non-editable workbooks, the method comprising:
   presenting, by a workbook manager on a client computing system, a workbook in an exploration mode that displays edits to the workbook without altering the workbook, wherein the workbook presents a data set from a cloud-based data warehouse;
   receiving, by the workbook manager via the workbook, a change to the workbook and an edit to the data set from a client account associated with the client computing system;
   determining, by the workbook manager, that the client account is authorized to edit the data set on the cloud-based data warehouse and that the client account lacks authorization to commit changes to the workbook; and
   applying, by the workbook manager, the edit to the data set in the cloud-based data warehouse.

2. The method of claim 1, further comprising:
   presenting the workbook in the exploration mode comprising the change to the workbook on the client computing system without committing the change to the workbook.

3. The method of claim 2, further comprising:
   discarding the change to the workbook in response to detecting that the client account has closed the workbook.

4. The method of claim 2, further comprising:
   saving the workbook comprising the change to the workbook to a new workbook associated with the client account.

5. The method of claim 1, wherein determining that the client account is authorized to edit the data set on the cloud-based data warehouse and that the client account lacks authorization to commit changes to the workbook comprises determining that an owner of the workbook has granted the client account authorization to edit the data set on the cloud-based data warehouse and denied the client account authorization to commit changes to the workbook.

6. The method of claim 1, wherein the change to the workbook modifies a visualization of the workbook.

7. The method of claim 1, wherein the change to the workbook modifies a spreadsheet structure of the workbook.

8. The method of claim 1, wherein applying the edit to the data set in the cloud-based data warehouse comprises sending a database statement to the cloud-based data warehouse.

9. The method of claim 1, wherein the edit to the data set is new data to be added to the data set on the cloud-based data warehouse.

10. The method of claim 1, wherein the workbook manager is on an intermediary computing system between the client computing system and the cloud-based data warehouse.

11. An apparatus for editing data sets via non-editable workbooks, the apparatus comprising a computer processor, a computer memory operatively coupled to the computer processor, the computer memory having disposed within it computer program instructions that, when executed by the computer processor, cause the apparatus to carry out the steps of:
   presenting, on a client computing system, a workbook in an exploration mode that displays edits to the workbook without altering the workbook, wherein the workbook presents a data set from a cloud-based data warehouse;

receiving, via the workbook, a change to the workbook and an edit to the data set from a client account associated with the client computing system;

determining that the client account is authorized to edit the data set on the cloud-based data warehouse and that the client account lacks authorization to commit changes to the workbook; and applying the edit to the data set in the cloud-based data warehouse.

12. The apparatus of claim 11, wherein the computer program instructions further cause the apparatus to carry out the step of:

presenting the workbook in the exploration mode comprising the change to the workbook on the client computing system without committing the change to the workbook.

13. The apparatus of claim 12, wherein the computer program instructions further cause the apparatus to carry out the step of:

discarding the change to the workbook in response to detecting that the client account has closed the workbook.

14. The apparatus of claim 12, wherein the computer program instructions further cause the apparatus to carry out the step of:

saving the workbook comprising the change to the workbook to a new workbook associated with the client account.

15. The apparatus of claim 11, wherein determining that the client account is authorized to edit the data set on the cloud-based data warehouse and that the client account lacks authorization to commit changes to the workbook comprises determining that an owner of the workbook has granted the client account authorization to edit the data set on the cloud-based data warehouse and denied the client account authorization to commit changes to the workbook.

16. The apparatus of claim 11, wherein the change to the workbook modifies a visualization of the workbook.

17. The apparatus of claim 11, wherein the change to the workbook modifies a spreadsheet structure of the workbook.

18. The apparatus of claim 11, wherein applying the edit to the data set in the cloud-based data warehouse comprises sending a database statement to the cloud-based data warehouse.

19. The apparatus of claim 11, wherein the edit to the data set is new data to be added to the data set on the cloud-based data warehouse.

20. A computer program product for editing data sets via non-editable workbooks, the computer program product disposed upon a non-transitory computer readable medium, the computer program product comprising computer program instructions that, when executed, cause a computer to carry out the steps of:

presenting, on a client computing system, a workbook in an exploration mode that displays edits to the workbook without altering the workbook, wherein the workbook presents a data set from a cloud-based data warehouse;

receiving, via the workbook, a change to the workbook and an edit to the data set from a client account associated with the client computing system;

determining that the client account is authorized to edit the data set on the cloud-based data warehouse and that the client account lacks authorization to commit changes to the workbook; and applying the edit to the data set in the cloud-based data warehouse.

* * * * *